United States Patent [19]

Felder

[11] Patent Number: 4,711,381

[45] Date of Patent: Dec. 8, 1987

[54] BICYCLE RACK WITH SAFETY LIGHT

[76] Inventor: Willie L. Felder, 2475 Elliot Ave., S., Minneapolis, Minn. 55404

[21] Appl. No.: 884,727

[22] Filed: Jul. 11, 1986

[51] Int. Cl.$^4$ ............................................. B62J 7/00
[52] U.S. Cl. .................................. 224/39; 224/32 R; 362/72
[58] Field of Search ............ D26/28, 29, 34, 35, D26/36; 224/30 R, 31, 32 R, 32 A, 39; 362/72, 73; D12/158

[56] References Cited

U.S. PATENT DOCUMENTS

| 2,694,138 | 11/1954 | Schwinn | D26/28 |
| 3,963,158 | 6/1976 | Clenet | 224/32 A |
| 4,085,317 | 4/1978 | Mithoff | 362/72 |

*Primary Examiner*—Henry J. Recla
*Assistant Examiner*—David Voorhees
*Attorney, Agent, or Firm*—James V. Harmon

[57] ABSTRACT

An illuminated bicycle rack is provided which includes an article support platform having as its side edges a pair of longitudinally extending laterally spaced apart hollow tubular stringers each with a light casing at its rearward end and serving as a shroud for the conductors which extend forwardly from the bulbs mounted within the bulb casings to a battery box connected between the forward ends of the stringers. Brackets extend between the stringers and include legs that project downwardly for mounting the rack upon the bicycle frame.

6 Claims, 5 Drawing Figures

BICYCLE RACK WITH SAFETY LIGHT

FIELD OF THE INVENTION

This invention relates to an improved rack to be mounted above the rear wheel of a bicycle. The rack includes built-in safety lights and batteries.

BACKGROUND OF THE INVENTION

Provision has been made in the past for illuminating the bicycle rack but the lights previously proposed have been fastened to the rack as an attachment that can easily become loose, dislodged or subject to malfunction and the conductors are not protected. It is also significant that previous lights proposed for use on a bicycle rack interfere with the smooth lines of the rack and the supports for the light form no structural function as in holding the articles mounted on the rack, i.e., the light supports are not structural components of the rack and do nothing to aid in the support of articles being carried on the rack.

An object of the present invention is to provide an improved illuminated bicycle rack of strong, lightweight construction in which the light supports are structural elements of the rack and wherein a pair of laterally spaced structural elements each carry a light casing integrally connected to its rearward end. A further object is to provide structural support elements defining the side edges of an article carrying platform each of which serves as a protective shroud for electrical conductors extending forwardly from the lights. A further object is to provide battery support at the front end of the rack preferably extending across the rack from side to side serving as an additional brace or connector fastened between longitudinally extending stringers that form the side rails of the supporting platform of the rack. Still another object is to provide an illuminated bicycle rack with longitudinally extending stringers and one or more U-shaped brackets including parallel depending legs for mounting the rack on a bicycle and a horizontally extending cross member connected between the stringers. The battery support holds the stringer together and also acts as a butress for the articles being carried.

SUMMARY OF THE INVENTION

The objectives of the invention are accomplished by the provision of an illuminated bicycle rack with an article supporting platform having a pair of longitudinally extending laterally spaced apart hollow tubular article supporting stringers defining the side edges of the article supporting platform and each of the stringers carrying a light casing at its rearward end. The rear end of each of the hollow tubes has an outwardly flared extension. The outwardly flared extension encloses and supports a light bulb socket adapted to receive a bulb. An opening at the rear end of the flared extension enables the light from the bulb to be directed rearwardly. A battery support means is mounted on the rack preferably on the front thereof. It is connected to the stringers. At least one electrical conductor extends through each of the hollow stringers whereby the stringers support both the battries and the lights as well as protecting the conductors by serving as shrouds. Brace members are connected laterally between the stringers to establish spacing between them and legs extend from the stringers downwardly and are adapted to be connected to the framework of the bicycle.

DETAILED DESCRIPTION OF THE INVENTION

Figure 1:
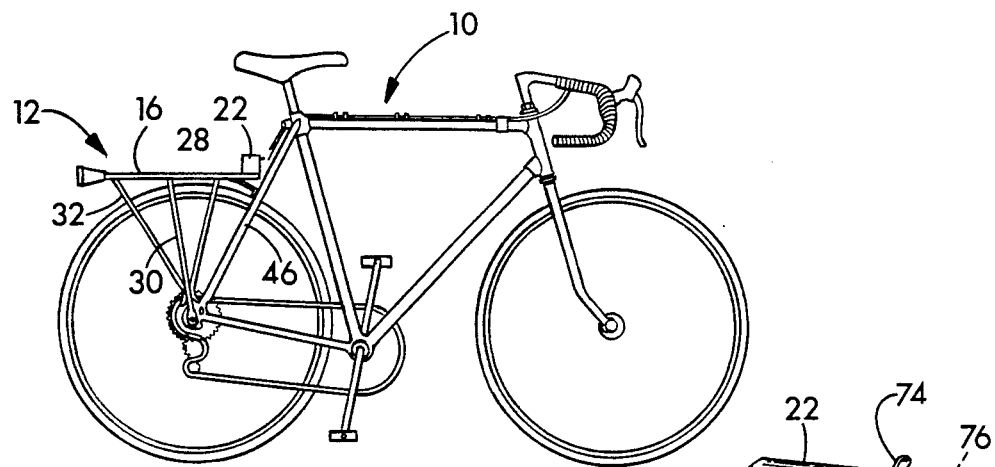
FIG. 1 is a side elevation view of the bicycle having a rack in accordance with the invention mounted above the rear wheel.

Shown in FIG. 1 is a bicycle 10, in this case a racing bicycle having a rack 12 in accordance with the invention mounted above the rear wheel of the bicycle. The rack 12 includes a pair of longitudinally extending laterally spaced apart frame members or stringers 14 and 16, each of which comprises a hollow tube and defines the side edges of an article mounting platform upon which objects are placed when the rack is in use. It can thus be understood that the stringers 14 and 16 serve as the side edges of the mounting platform upon which books, packages and other articles are mounted when the rack is in use. Provided on the rear end of each of the stringers 14 and 16 is a flared extension 18, 20 which serves as a casing for a light bulb and will be described in more detail below.

Figures 2, 3, 5:
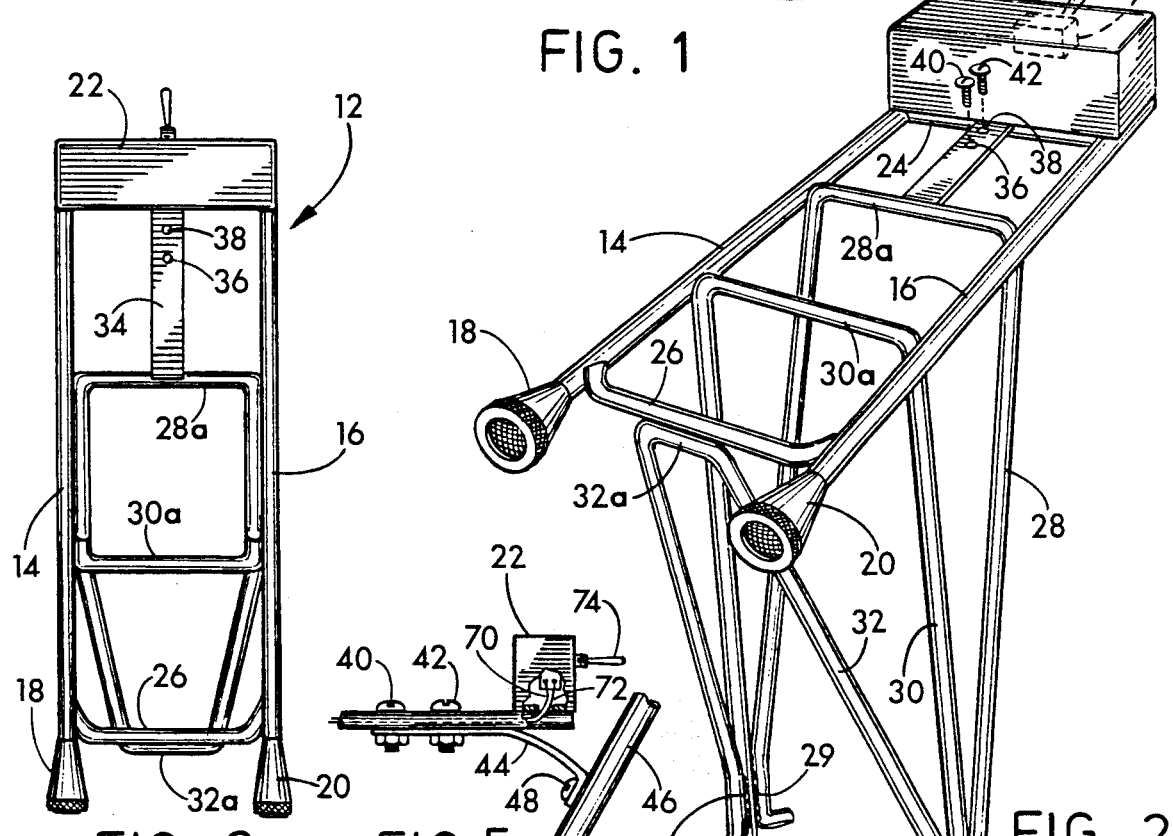
FIG. 2 is a perspective view of the rack on a larger scale.
FIG. 3 is a top view of the rack of FIGS. 1 and 2.
FIG. 4 is an enlarged vertical sectional view of one of the light casings at the rear of the rack and FIG. 5 is a vertical sectional view of the forward end of the rack.

Connected between the forward ends of the stringers 14 and 16 is a battery support means which comprises in this case a battery box 22 adapted to hold one or more batteries for powering the lights. The battery box 22 will normally serve as a structural element connecting the forward ends of the tubes 14 and 16 to hold them at the required spacing and strengthen the rack. An additional cross frame member 24 can, if desired, be welded between the forward ends of the stringers 14 and 16 as shown in FIG. 2. Between the rearward ends of the stringers 14 and 16 is rigidly mounted a second cross member such as a rod 26 which can be welded to the stringers at opposite ends.

The rack also includes three downwardly extending brackets 28, 30 and 32 for mounting and supporting the rack on the bicycle. The brackets 28, 30 and 32 each include a pair of vertically disposed legs connected at their upper ends by integral center sections which serve as braces and extend laterally in a horizontal plane between the longitudinally extending stringers 14 and 16 to space them at the proper distance as well as forming the structural part of the article support platform defined between the stringers 14 and 16. The brackets 28-32 can be welded in place between the stringers 14 and 16 and, in the case of the bracket 32, the horizontal brace portion 32a can be conveniently welded to the cross member 26. The cross members of the brackets 28-32 are numbered consecutively 28a, 30a and 32a.

The brackets converge at their lower ends and are connected rigidly together as by welding shown at 29 and 33 in FIG. 2. This provides a rigid structure which is rugged in construction and reliable in operation. The lower ends of the bracket 30 are bored at 31 to receive bolts for mounting the rack on the bicycle.

Welded between the brace 28a and brace 24 is a longitudinally extending horizontally disposed strap 34 which is bored at 36 and 38 to receive bolts 40 and 42 for fastening the forward end of the bracket to a brace arm 44 which is usually provided as a part of the bicycle and is secured to the frame member 46 by means of a bolt 48 (FIG. 5).

Figure 4:
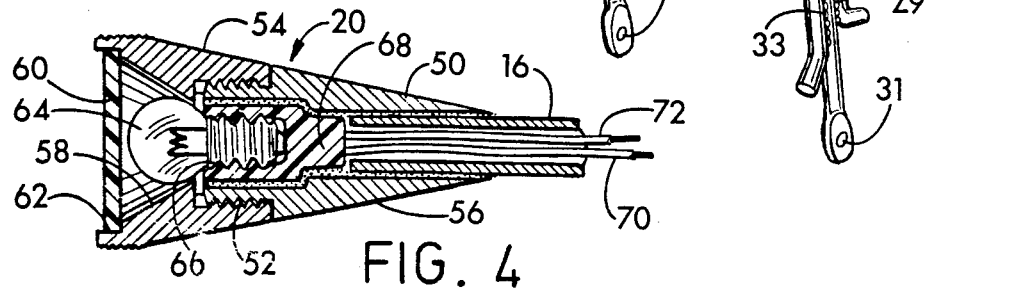

Refer now to FIG. 4 which illustrates the light bulb casing 20. It will be understood that the casings are identical so that only one need be described in detail. As can be seen, the casing 20 flares outwardly at the rearward end of the stringer 16 and is continuous therewith communicating through to the inside of the hollow center of the stringer. The casing can be integral with the stringer or, if desired, secured in place by friction or by means of an adhesive. As can be seen, the outside surface 56 of the casing 50 is generally conical and flares outwardly proceeding toward the rear of the rack. The rear of the casing member 50 is threaded at 52 to receive a cap 54 having a surface which is continuous with the surface 56 of the casing member 50. Mounted inside the casing member 50 is a light bulb socket 68 internally threaded at 66 to receive a light bulb 64. Inside of the cap 54 is provided an inner wall 58 which is preferably reflective to help reflect light rearwardly from the bulbs 64. Mounted within the rear of the cap 54 is a transparent lens 60 which is usually colored, e.g., red, amber or yellow. Extending from the socket 68 forwardly through each of the stringers 14 and 16 are conductors 70 and 72 which extend out at the front end of the stringers into the battery box 22 and are connected to the battery (not shown). At the front of the battery box 22 is an electrical switch such as a toggle switch 74 for turning on and off the lights 18 and 20 manually. The switch 74 can, if desired, include a flasher for flashing either of the lights 18 or 20 to indicate a turn. It will be noticed by inspection of FIG. 1 that the switch 74 will be in a convenient position for the rider to operate comfortably while the bike is in motion. Optionally within the battery box is provided a directional signal 76 so that turning the switch 74 to the left, for example, the left light in casing 18 can be actuated while by moving the toggle switch 74 to the right, the right light 20 can be actuated. If this option is exercised, the toggle switch 74 should be a three-way switch. Otherwise, the switch 74 can simply comprise an one and off switch for operating both lights.

Many variations of the present invention within the scope of the appended claims will be apparent to those skilled in the art when the principles described above by way of example are understood.

What is claimed is:

1. An illuminated bicycle rack comprising an article supporting platform having a pair of longitudinally extending, laterally spaced apart tubular article supporting stringers defining the side edges of the article support platform, each stringer carrying a light casing at the rear end thereof, the rear end of each of the stringers having an extension connected thereto to define said light casing and supported solely by the rearward end of the stringer, each extension projects rearwardly from the stringer and has a forward end affixed to the rear end of the stringer, each said extension enclosing and supporting a light bulb socket adapted to receive a bulb, said extensions for the bulb being spaced apart from one another behind the stringer and behind other portions of the rack connected to the stringers to define an open center area between the extensions thereby reducing the weight of the rack at its rear end and enhancing streamlining thereof, each said extension having an opening at the rear end thereof, said opening having a bulb cap thereon, said cap having a transparent lens therein, whereby light from the bulb can be directed rearwardly of the rack, battery support means mounted upon the rack and connected to the stringers in the vicinity of the forward ends of the stringers, at least one electrical conductor extending through each of the hollow stringers between the light casing and the battery support means whereby the stringers support both the battery support and the lights and protect the conductors extending therebetween, brace members extending horizontally between the stringers and connected thereto to establish the spacing therebetween, and legs extending from the stringers downwardly and said legs being adapted to be connected to the framework of the bicycle to support the rack.

2. The article of claim 1 wherein the battery support means comprises a battery box mounted in the vicinity of the forward end of the stringers and extending upwardly therefrom to form a forward buttress for articles mounted upon the rack to assist in their support.

3. The article of claim 1 wherein the rack includes U-shaped brackets, each of the brackets including parallel vertically disposed legs and the braces comprise a center portion between the legs of the bracket extending horizontally between the stringers and are connected therebetween to form a portion of the article supporting platform of the rack.

4. The article of claim 1 wherein the light at the rearward end of one of the stringers is a left turn indicator light and the other light is a right turn indicator light, a three-way turn indicator switch is connected to the battery for operating it as a left or right turn indicator light as desired.

5. The combination of claim 4 wherein a flasher is wired between the light and the battery to flash the lights when a turn is indicated by operating the switch to indicate a left or right turn.

6. The apparatus of claim 1 wherein said light casing includes a first conical portion connected to one of the stringers and having threads at the rearward end thereof, a bulb socket is mounted therein and a threaded cap is screw threaded upon the threads at the rearward end of the concial portion of the casing, said cap having an opening at its rearward end with a transparent lens therein.

* * * * *